United States Patent
Offer et al.

(10) Patent No.: US 6,889,889 B2
(45) Date of Patent: May 10, 2005

(54) FUSION-WELDING OF DEFECTIVE COMPONENTS TO PRECLUDE EXPULSION OF CONTAMINANTS THROUGH THE WELD

(75) Inventors: Henry P. Offer, Los Gatos, CA (US); Siamak Bourbour, San Jose, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/454,598

(22) Filed: Jun. 5, 2003

(65) Prior Publication Data

US 2004/0245323 A1 Dec. 9, 2004

(51) Int. Cl.$^7$ .......................... B23K 31/00; B23K 31/02
(52) U.S. Cl. ....................... 228/119; 228/165; 228/166; 29/897.1; 29/402.01
(58) Field of Search ..................... 29/888.011, 888.021, 29/888.041, 889.1, 895.1, 897.1, 402.01, 402.18, 402.19, 402.21, 564.7; 228/164, 165, 166, 173.1, 174, 205, 219, 119, 245–255

(56) References Cited

U.S. PATENT DOCUMENTS

| | | | | |
|---|---|---|---|---|
| 4,089,455 A | * | 5/1978 | Fellers | 228/178 |
| 4,098,451 A | * | 7/1978 | Smith et al. | 228/119 |
| 4,105,887 A | * | 8/1978 | Marshall et al. | 219/72 |
| 4,513,903 A | * | 4/1985 | Feldstein et al. | 228/107 |
| 4,583,672 A | * | 4/1986 | Bibb et al. | 228/2.5 |
| 5,059,384 A | * | 10/1991 | Dixon et al. | 376/260 |
| 5,345,484 A | | 9/1994 | Deaver et al. | |
| 5,527,441 A | | 6/1996 | Offer | |
| 5,530,219 A | | 6/1996 | Offer et al. | |
| 5,649,355 A | | 7/1997 | Offer | |
| 5,670,072 A | | 9/1997 | Offer et al. | |
| 5,688,419 A | | 11/1997 | Offer | |
| 5,714,735 A | | 2/1998 | Offer | |
| 5,732,467 A | * | 3/1998 | White et al. | 29/889.1 |
| 5,756,966 A | | 5/1998 | Offer | |
| 5,770,273 A | | 6/1998 | Offer et al. | |
| 5,793,009 A | | 8/1998 | Offer | |
| 5,852,271 A | | 12/1998 | Offer | |
| 5,873,703 A | * | 2/1999 | Kelly et al. | 416/241 R |
| 5,977,504 A | | 11/1999 | Offer et al. | |
| 5,981,897 A | | 11/1999 | Offer et al. | |
| 5,994,659 A | | 11/1999 | Offer | |
| 6,053,652 A | | 4/2000 | Deaver et al. | |
| 6,086,120 A | | 7/2000 | Deaver et al. | |
| 6,108,391 A | | 8/2000 | Deaver et al. | |
| 6,255,616 B1 | | 7/2001 | Offer | |
| 6,373,019 B1 | | 4/2002 | Offer et al. | |
| 6,375,230 B1 | | 4/2002 | Jensen et al. | |
| 6,417,476 B1 | | 7/2002 | Offer et al. | |
| 6,605,794 B1 | | 8/2003 | Offer et al. | |
| 6,761,502 B2 | * | 7/2004 | Bishop et al. | 403/278 |
| 2003/0002916 A1 | * | 1/2003 | Bishop et al. | 403/278 |

FOREIGN PATENT DOCUMENTS

| | | | |
|---|---|---|---|
| EP | 1312437 A1 | * | 5/2003 |
| JP | 355034676 A | * | 3/1980 |

* cited by examiner

*Primary Examiner*—Stanley S. Silverman
*Assistant Examiner*—Colleen P. Cooke
(74) *Attorney, Agent, or Firm*—Nixon & Vanderhye

(57) ABSTRACT

A component which has a surface crevice or crack and contaminants on at least one face of the opening is welded. The weld is effected by first plastically deforming the surface of the component to close the surface opening to a predetermined depth less than the depth of the opening and contaminated faces defining the opening to form a sealed ligament. The sealed ligament leaves unclosed a portion of the crack below the sealed ligament. The closed surface is hermetically sealed by fusion-welding to a depth of penetration equal to or less than the predetermined depth of the sealed ligament to minimize or eliminate expulsion of contaminants in the sealed ligament.

17 Claims, 7 Drawing Sheets

FUSION-WELDING OF DEFECTIVE COMPONENTS TO PRECLUDE EXPULSION OF CONTAMINANTS THROUGH THE WELD

BACKGROUND OF THE INVENTION

The present invention relates to apparatus and methods for fusion-welding of creviced or defective, e.g., cracked, components having contaminants, e.g., liquid, oxides and the like, trapped in the components and particularly relates to underwater fusion-welding of creviced or cracked components to preclude expulsion conditions leading to porosity and/or blowholes through the weld material.

Intergranular stress corrosion cracks, fatigue cracks, unfused weld material, base metal laminations, joint crevices and other defects which are open to the surface of components submerged in a liquid, e.g., water, trap the liquid within their volume. For example, if the defect has been exposed to a high-temperature liquid, e.g., water environment during service, such as in a nuclear reactor, there is necessarily also an oxide on the creviced or defective surfaces. With the oxide being present, heat from fusion-welding processes typically reduces the oxide to metal and free oxygen, causing increased, unacceptable gas expansion and disruption of the weld pool. Even if oxides are not present, when the heat of a welding process is applied to the defective component, the liquid in the crevice or crack turns to a vapor and causes the weld pool to be displaced by the expanding gas. It will be appreciated that the expulsion condition, e.g., out-gassing, leads to porosity and/or blowholes, preventing crack-like defects or crevices in underwater components from being successfully sealed, despite repeated attempts at welding them closed. These problems also occur in crevices resulting from fitting of components together for joining by welding when at least one of the mated component surfaces has been in high-temperature water service.

To applicants' knowledge, there is no known conventional method for remotely cleaning and sealing water-containing or oxide-containing cracks or crevices so that conventional fusion-welding can be performed thereafter without substantial risk of formation of gas blowholes or internal porosity. Current practices, when confronting this problem, are to remove and replace the entire defective component in a dry environment. An alternative solution is to install mechanically-fastened clamps and bolting to reinforce the cracked area/joint. Such joints, however, introduce undesirable crevices, e.g., leading to corrosion, of their own and consume additional space which, in certain instances, is at a premium. Another alternative is to fully remove the crack or crevice with an underwater excavation process to remove the contamination. This, however, requires additional expense and is fraught with technical difficulty, particularly because it is difficult to determine when the entirety of the cracking has in fact been removed. A still further alternative is to weld directly over the open wet and contaminated defect and to suffer the low-quality caused by the resulting blowholes and/or porosity. In this case, additional weld reinforcement may be required to compensate for reduced weld quality. A still further alternative is to drain the liquid from around the component requiring repair. In many cases, however, such as in a nuclear reactor vessel, this leads to prohibitive radiation levels for welding operators and equipment. Accordingly, there is a need for a welding process for rehabilitating cracked components in a manner to reduce or eliminate expulsion, e.g., out-gassing associated with welding substrates containing wet and/or contaminated cracks or crevices.

BRIEF DESCRIPTION OF THE INVENTION

In accordance with a preferred embodiment of the present invention, there is provided apparatus and methods for fusion-welding of cracked or creviced components in a submerged liquid environment having water or oxide-containing defects, i.e., contaminants, in a manner which eliminates or substantially precludes porosity or blowholes in the weld material. Particularly, the crack or crevice is closed by a plastic deformation of the surface of the component to a predetermined depth less than the depth of the crack or crevice opening to form a sealed ligament overlying an unclosed portion of the crack or crevice, followed by a fusion-welding of the sealed ligament. For example, the crack is closed by applying a pressure to one side of the crack using a roller or mechanical peening to close the surface opening of the crack to a predetermined minimum depth. Hermetic sealing is performed with a fusion-welding process having controlled heat input and travel speed so that the depth of penetration is no greater than and preferably less than the depth of the closed portion of the crack. That is, the heat input and travel speed of the welding apparatus are applied to the deformed crack such that the portion of the contaminants in the sealed ligament are boiled out. The heat input is not sufficient to penetrate into the underlying unclosed portion of the crack and, consequently, the tendency of the contaminants in that unclosed crack portion to out-gas is reduced or eliminated.

Since the weld penetration depth at any heat input per unit length of weld is a function of the thermal properties of the cracked or creviced substrate (and, in some cases, a function of the chemistry of the crack contaminants as well), the present invention is optimized when developed for a particular welding process and substrate material. For example, there must be a proper balance between the heat generated in the welding torch (combined with the thermal efficiency of the torch) and the depth of weld penetration into the substrate (combined with the thermal diffusivity of the substrate). The depth of penetration of the weld is also a function of the oxide content remaining within the crack or crevice with increased surface oxide leading to greater penetration and the need for either a lower heat input, higher travel speed and/or a greater depth of the closed portion (sealed ligament) of the crack.

For a given type of welding torch, process parameters and substrate material, this balance is not a constant but is a function of the torch travel speed, even though travel speed is already taken into account in the calculation of the "normalized" heat input (heat input per unit length of weld). Even though high heat input is well known to lead to increased weld penetration, and even though, in a preferred embodiment, the sealing weld does not penetrate beyond the depth of the closed portion (sealed ligament) of the crack, the most effective combination of welding parameters is higher heat input and a faster travel speed of the welding torch. The higher heat input enables the trapped contaminants to be more fully evaporated for displacement beyond or mixing within the weld pool, while the faster travel speed prevents penetration to an extent greater than the closed crack depth (sealed ligament). Also, since original unclosed cracks are not oriented perpendicular to the weld surface, they may interfere with normal heat transfer in the depth direction, causing a further disturbance of the weld pool. Deforming the cracks until tightly closed to a selected depth affords the benefit of a more continuous thermal path and weld penetration uniformity.

Remote excavation of a portion of the cracked depth enables subsequent weld repair to be made such that the structural margin of the component may be regained, while keeping excavation time and welding time to a minimum. An EDM (electrical discharge machining) process may be used as well as an alternative excavation process. That process, however, sometimes leave particles of removed material (known as dross or swarf) in the crack remnant, making subsequent crack closure and sealing difficult. The present preferred embodiment incorporates a fluid or gas jet nozzle directed at the work surface so that a gas or liquid can be used to clean at least the nearest surface portion of the crack of contaminants. If the jet flow is aggressive, such as a high-pressure water jet, it is also useful to remove oxides from the crack surfaces as well as contamination from the excavation or other surfaces. Plastic deformation of the crack surface or surfaces follows these cleaning steps. Ultrasonic cleaning is another optional step to clean contaminants from the crack. By vibrating the water at the mouth of the crack, causing a pressure differential within the crack and flushing of the particles within, or by cavitation of the water, causing a boiling-type action to effect flushing of the particles, the contaminants can be removed. Ultrasonic cleaning, however, requires the ultrasonic transducer to be located outside a water exclusion device to provide water coupling to the crack. The exterior location of the ultrasonic transducer also allows the removed contamination to be kept out of the water exclusion device. If crack cleaning is performed by a gas jet, and is located within the water exclusion device, the gas helps dry the water from within the crack before crack closure. The gas jet may be preheated to accelerate drying, if necessary. While the present invention has application specifically to underwater welding such as in a nuclear reactor, it will be appreciated that the present method can also be successfully used as a preparatory step in conventional dry environment welding applications where cracks contaminated with species other than liquids are suspected, but remain undetected.

In a preferred embodiment according to the present invention, there is provided a method of welding a component having an opening through a surface and contaminants on opposite side faces defining the opening, comprising the steps of (a) plastically deforming the surface of the component on at least one side of the opening to close the opening through the surface to a predetermined depth less than the depth of the opening to form a sealed ligament overlying an unclosed portion of the opening and (b) hermetically sealing the closed surface opening by fusion-welding to a depth of penetration less than or equal to the predetermined depth of the sealed ligament to minimize or eliminate expulsion of the contaminants in the sealed ligament.

In a further preferred embodiment according to the present invention, there is provided a method of welding underwater a cracked or creviced component having a surface opening, comprising the steps of (a) plastically deforming the surface or near-surface material of the component on at least one side of the opening to close the surface opening to a predetermined depth less than the depth of the opening to form a sealed ligament between the surface of the component and an underlying unclosed portion of the surface opening, (b) excluding the water from contact with the surface opening and (c) while the water is excluded, hermetically sealing the closed surface opening by fusion-welding to a depth of penetration no greater than the predetermined depth of the sealed ligament to minimize or eliminate expulsion of the water in the sealed ligament.

DETAILED DESCRIPTION OF THE INVENTION

Figure 1:
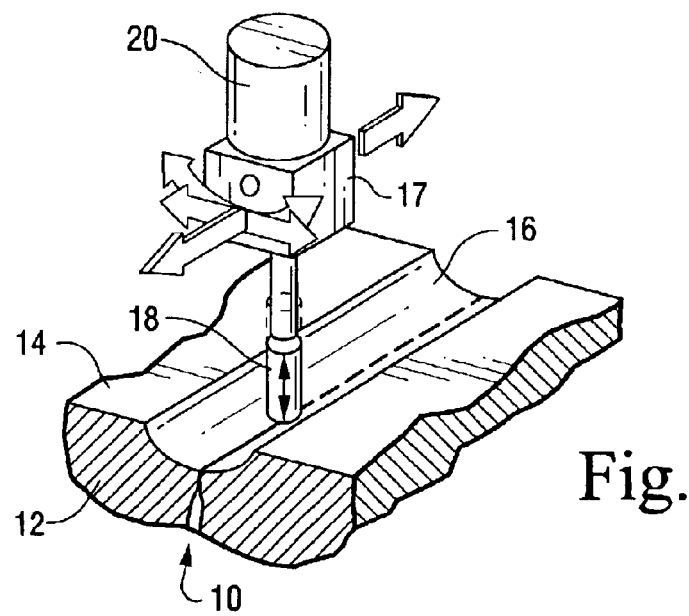
FIG. 1 is a fragmentary perspective schematic view of a peening assembly for plastically deforming an excavated crack in a surface.

Referring now to the drawings, particularly to FIG. 1, there is illustrated a tool for plastically deforming one or both margins or sides of a crack to close the crack to form a sealed ligament while retaining an unclosed portion of the crack underlying the sealed ligament. Particularly, the crack, generally designated 10, is formed in a component 12 and is typically exposed through the surface 14 of the component 12. The crack typically extends from the surface 14 and inwardly of the component. In FIG. 1, the surface 14 has been excavated to form a recess or trough 16, although it will be appreciated that the present apparatus and methods may be applied without first excavating the surface 14. Also illustrated in FIG. 1 is a peening tool 17 having a deformation or peening head 18 driven by a transducer 20. The tool is movable linearly in orthogonally-related directions and along a curvilinear path as indicated by the arcuate arrow. The tool head 18 vibrates along its axis, as indicated by the arrow, and effects a plastic deformation of at least one side of the component defining the crack 10. It will also be appreciated that the environment in which the component 12 and tool 17 are exposed may be a submerged environment, e.g., an underwater environment in a nuclear reactor vessel.

Figure 2:
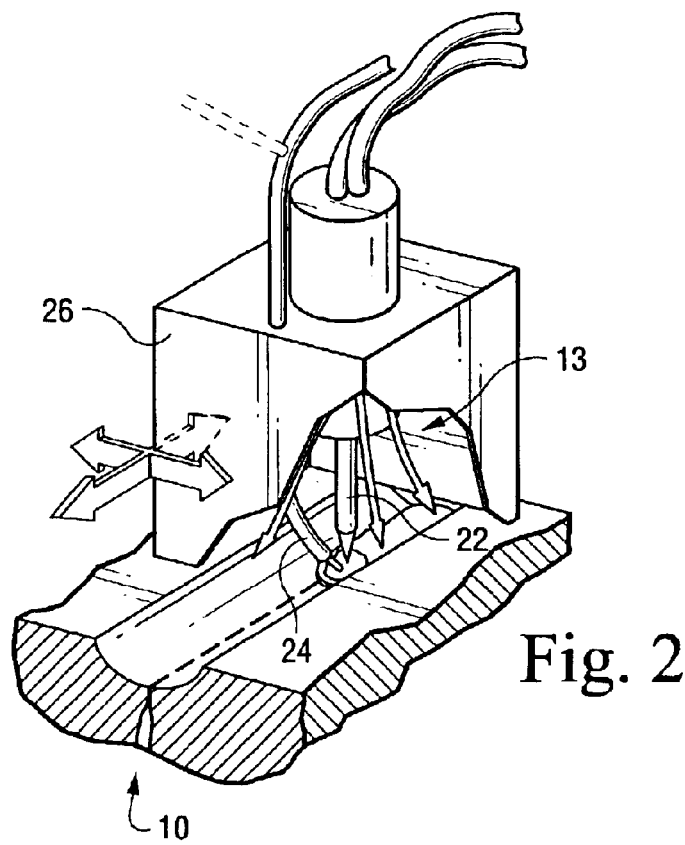
FIG. 2 illustrates a welding assembly for fusion-welding the closed crack (sealed ligament)

FIG. 2 illustrates a subassembly particularly useful in an underwater environment for fusion-welding the opposite side portions of the crack to one another, the fusion welding process being generally indicated at 13. As illustrated in FIG. 2, the assembly includes a welding electrode 22 and weld material 24 disposed within a water exclusion device 26. The assembly is movable in orthogonally-related directions as indicated by the arrows and particularly along the length of the crack 10. The water exclusion device 26 may comprise any one of a number of different forms. For example, one form of water exclusion device is described and illustrated in U.S. Pat. No. 6,417,476, issued Jul. 9, 2002, of common assignee herewith, the disclosure of which is incorporated herein by reference. It will be appreciated that the plastic deformation of the crack as explained hereinbelow and fusion-welding of the crack may be provided, employing separate units operated in sequence or as part of a single unit.

Figure 3:
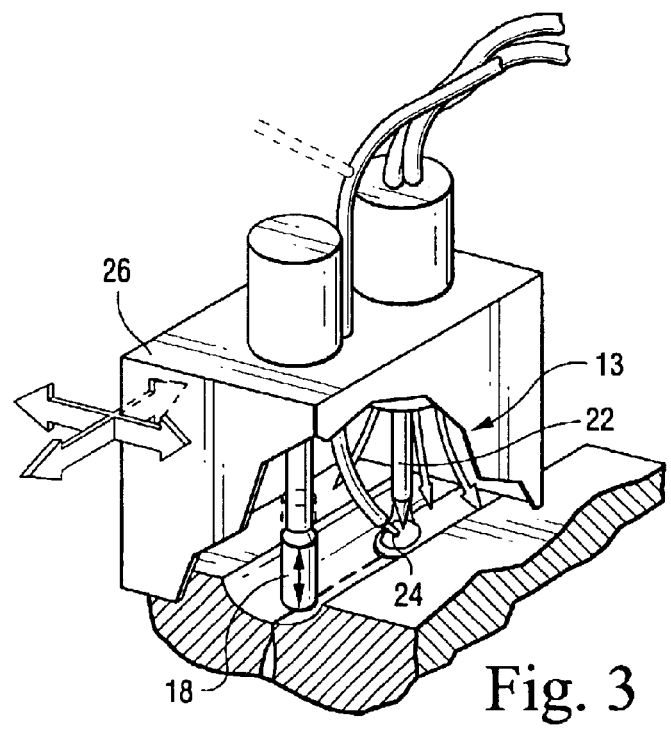
FIG. 3 is a fragmentary schematic illustration of a peening and welding subassembly within a water exclusion device.
Figure 4:
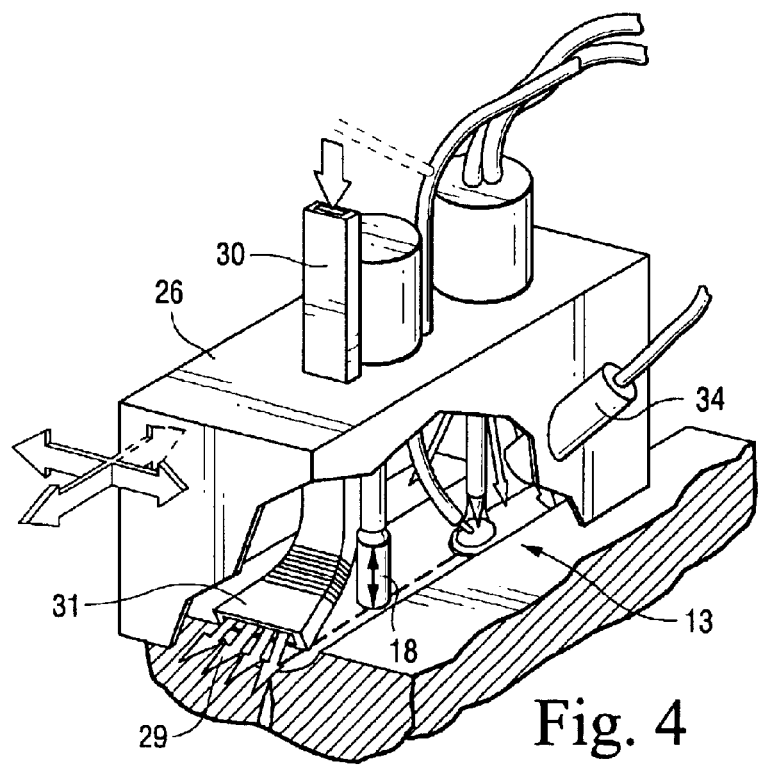
FIG. 4 is a view similar to FIG. 3 with the addition of a gas jet for removing particulate matter from the crack.

As illustrated in FIGS. 3 and 4, the deformation and welding assemblies may be integrated into a single unit. For example, in FIG. 3, the peening head 18 is incorporated into a water exclusion device 26. Also within the exclusion device 26 is the welding head including the electrode 22 and weld material 24. Consequently, the assembly of FIG. 3 is moved longitudinally along the crack with the peening head 18 in advance of the welding electrode 22 whereby side portions of the crack are plastically deformed prior to fusion-welding. In FIG. 4, a similar arrangement is illustrated, except that the peening head 18 is preceded in the direction of travel by a jet of fluid 29. The jet of fluid 29 may be provided in a conduit 30 extending into the water exclusion device 26 and expressing a gas, e.g., air, or a liquid through a nozzle 31 into the crack to remove particulate material. Additionally, to facilitate the welding process, a camera 34 may be provided the water exclusion device 26 to observe and enable control of the process.

Figure 5A:
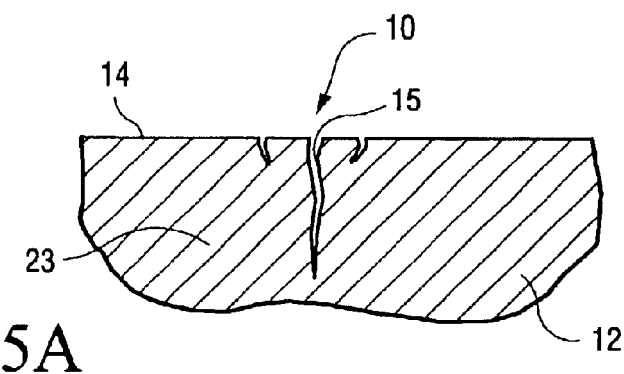
FIGS. 5A–5D illustrate various steps in a preferred process for deforming and fusion-welding a crack.
Figure 5B:
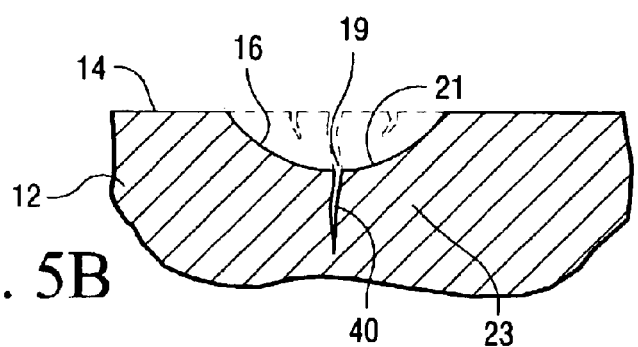
Figure 5C:
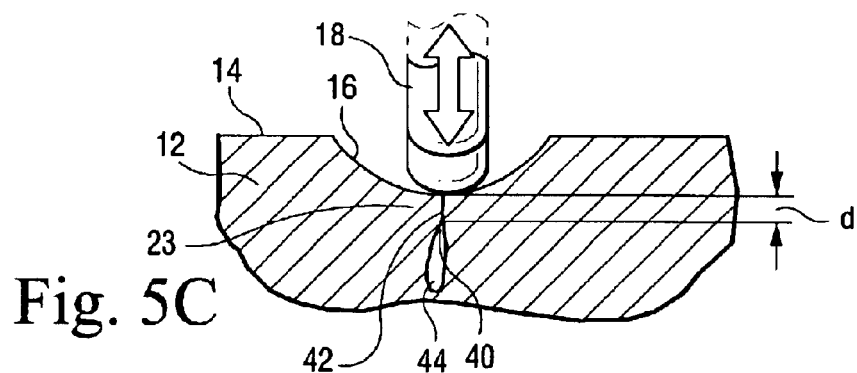
Figure 5D:
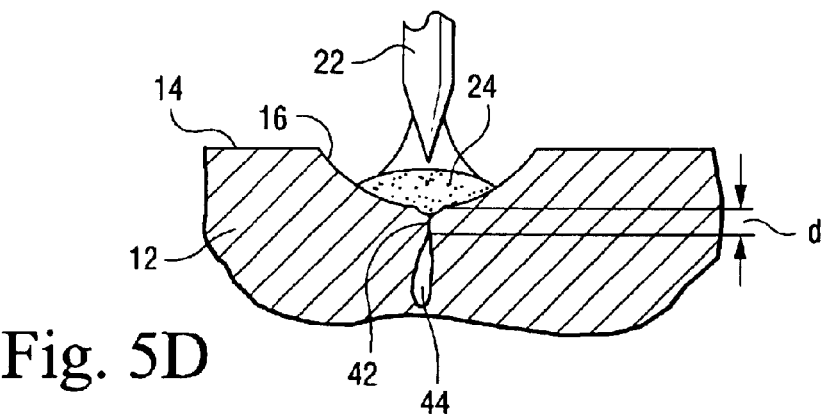

Referring now to FIGS. 5A–5D, there is illustrated a plastic deformation and welding process according to a preferred embodiment of the present invention. In FIG. 5A, the component 12 is illustrated with a plurality of cracks 10 formed in its surface 14 with opposite faces 15 of crack 10 having contaminants. Referring to FIG. 5B, the surface 14 of component 12 has been excavated to form a trough 16 having a width embracing the cracks 10 and a depth short of the entire depth of a portion 40 of crack 10. Crack 10 forms an opening 19 through the surface 21. With reference to FIG. 5C, the head 18 of a tool for plastically deforming the surface 21 or near-surface (underlying portions 23) of the remaining portion 40 of crack 10 is illustrated. The head 18, for example, may peen the surface 21 of the trough 16, plastically deforming surface 21 and underlying portions 23 on at least one side of the crack opening 19 to close the surface opening to a predetermined depth "d" less than the depth of the entire crack 10. By plastically deforming the material of component 12 at the surface 21 or near-surface of the remaining crack portion 40, a sealed ligament 42 is formed which extends between the surface of the trough 16 and the underlying unclosed portion 44 of crack portion 40. Thus, there remains in crack portion 44 underlying the sealed ligament 42 contaminants such as water or oxides. Referring to FIG. 5D, weld material 24 is applied in the trough 16 overlying the sealed ligament 42. The heat input from the welding torch 22 and the travel speed of the welding torch 22 along the length of the trough 16 is controlled so that the depth of penetration is less than the depth of the closed or sealed ligament 42 of the crack 10. That is, the sealed ligament 42 closes the crack adjacent the surface and the welding torch applies sufficient heat input to "boil-out" the portion of contaminants remaining in the sealed ligament 42 penetrated by the weld. The heat input, however, is insufficient to penetrate into the underlying unclosed portion 44 of the crack which remains contaminated, e.g., with water or oxides.

Once a first pass of weld material has been applied over the sealed ligament 42 in trough 16, subsequent peening and welding steps may also be performed. For example, the first level weld bead or weld material 24 may be subsequently peened using the head 18, followed by a second application of weld material. Additional peening and weld material applications may also be provided until the leakage or gas-out of the contaminants in the sealed ligament 42 and applied weld are completely contained. It will be appreciated that the peening and welding processes may be accomplished separately, i.e., utilizing the apparatus of FIGS. 1 and 2, or combined, for example, in the water inclusion devices illustrated in FIGS. 3 and 4.

Figure 6A:
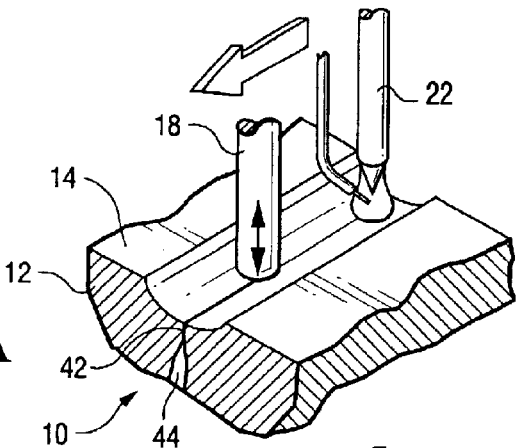
FIGS. 6A–6D illustrate in fragmentary perspective views a process of peening and fusion-welding a crack.
Figure 6B:
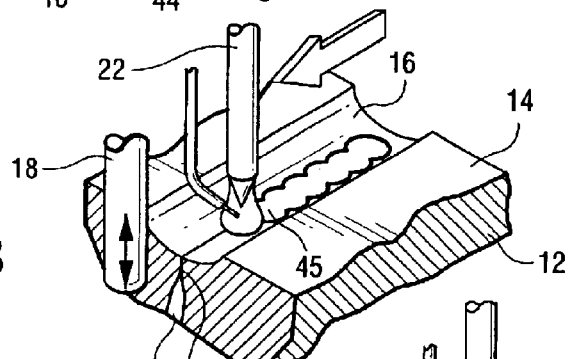
Figure 6C:
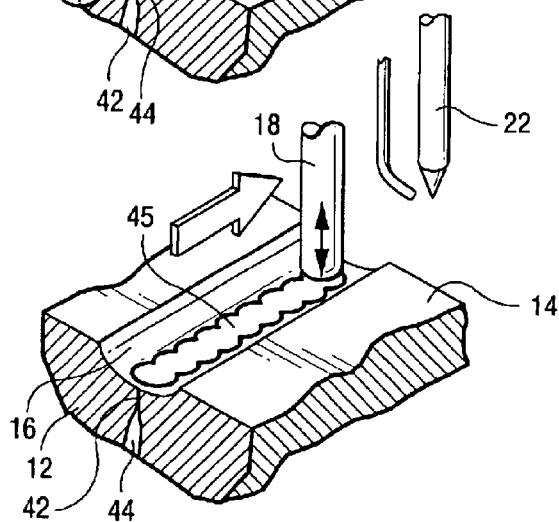
Figure 6D:
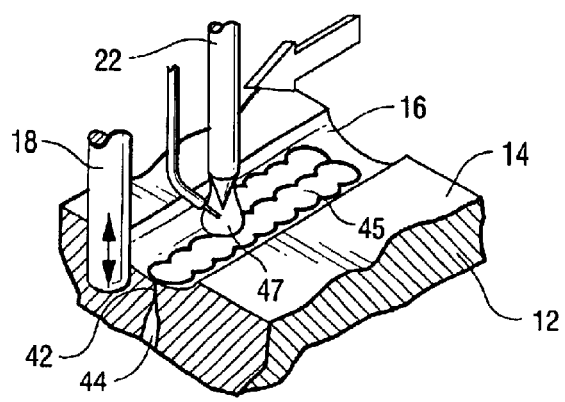

Referring now to drawing FIGS. 6A–6D, a similar sequence of operations may be performed using spot-welding techniques. For example, as illustrated in FIG. 6A, the head 18 is actuated to plastically deform the crack 10 and thereby form the sealed ligament 42, leaving an unclosed portion of the crack 44 underlying ligament 42. The partial closing of the crack is followed by a series of spot-welds 45 provided by the welding electrode 22 as illustrated in FIG. 6B. The welding device may be advanced and retracted along the welding surface with the peening head 18 peening the applied series of spot-welds 45 as illustrated in FIG. 6C. Second and subsequent passes illustrated in FIG. 6D of both the peening head and the welding torch may be provided, with each pass applying additional weld material 47 and using the peening head 18 to harden and/or densify the applied spot-weld material.

It will be appreciated that in the excavation of the crack, for example, to form the trough 16, particulates from the excavation process may remain in the trough and within the crack. A jet of fluid, i.e., a liquid or gas, for example, as illustrated by the jet of fluid 29 in FIG. 4, may be used to flush the particles from the trough or crack, or both, prior to plastic deformation and applying weld material. Additionally, it will be appreciated that the high pressure jet also reduces or removes oxides formed along the surfaces of the crack. Further, it will be appreciated that the crack can be treated to plastically deform and form the sealed ligament without the necessity of first excavating a trough along the crack formation. Thus, the surface of a component may be plastically deformed, for example, by peening, and weld material applied subsequently with the heat penetration sufficient only to minimize or eliminate out-gassing from the sealed ligament and overlying weld and insufficient to enable expulsion, e.g., out-gassing of contaminants within the closed portion of the crack.

Figure 7A:
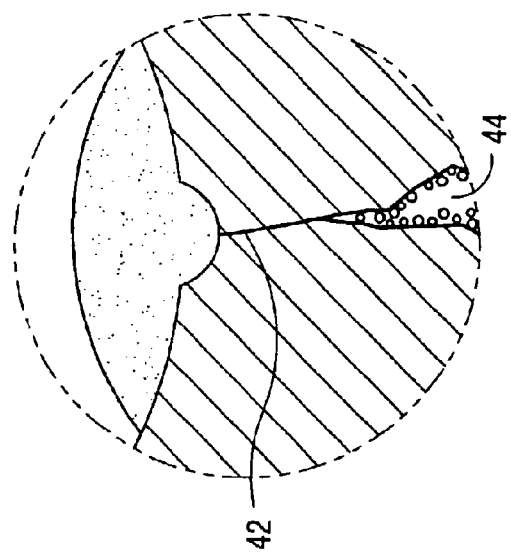
FIG. 7a illustrates a closed surface ligament after removal of particulates.
Figure 7:
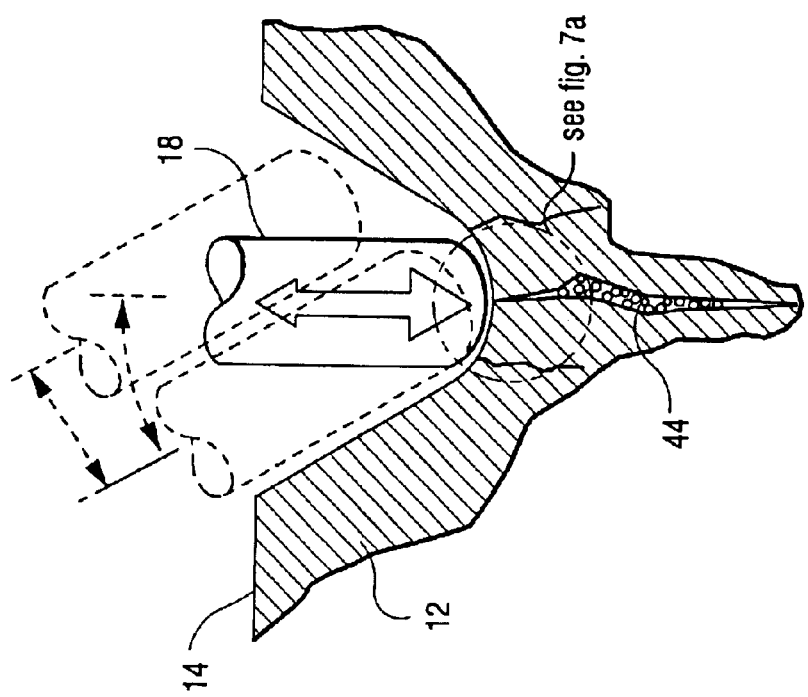
FIG. 7 is a fragmentary cross-sectional view illustrating surface plastic deformation to form the seal ligament.

Referring now to FIGS. 7 and 7a, there is illustrated a peening process in which the peening head 18 is rotated from side to side to form the ligament 42 and thereby trap particles, water and oxides in the underlying crack 44 below the sealed ligament. The side-to-side movement of the peening hammer, illustrated by the dashed lines and the arrows, facilitates formation of the sealing ligament 42 since residual particles and oxides can keep the crack from sealing properly. Preferably, therefore, the crack is initially treated with a jet of fluid, e.g., jet 29, to remove particles and oxides, followed by the movement of the peening head to impact along opposite sides of the crack to form the sealed ligament 44.

Figure 8:
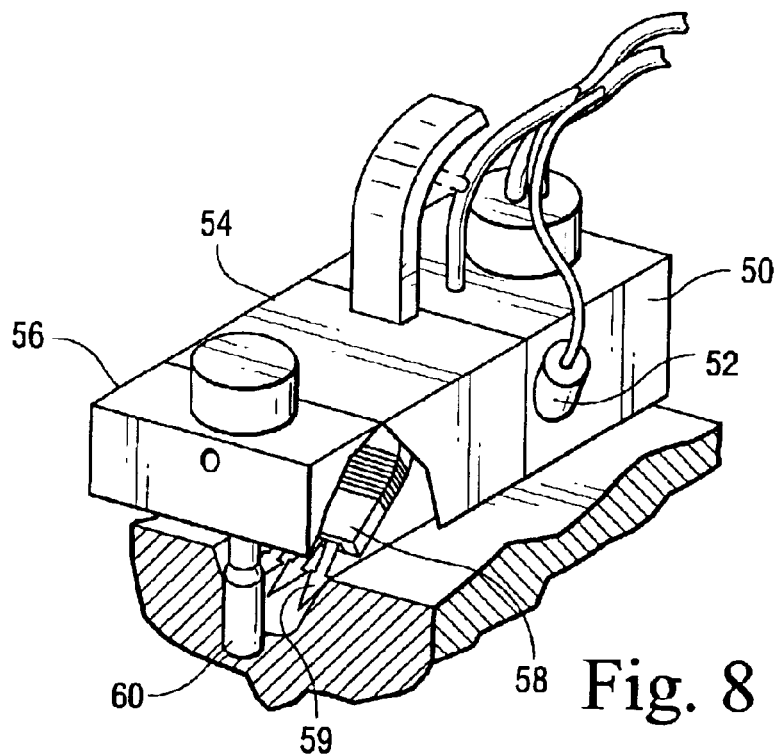
FIG. 8 is a fragmentary perspective view illustrating a welding module and peening assembly with gas jet cleaning.

Referring to FIG. 8, there is illustrated a welding module assembly which includes a welding module 50 containing a camera 52, a welding torch and weld material, both not shown, in conjunction with both a gas broom module 54 and a peening module 56. The gas broom includes a jet of gas 59 applied via a nozzle 58 for removing particulates from the sealed portion subsequent to the plastic deformation of the surface surrounding the crack. The peening head 60 of the peening module 56 precedes in the direction of travel the gas broom module 54 and welding module 50.

Figure 9:
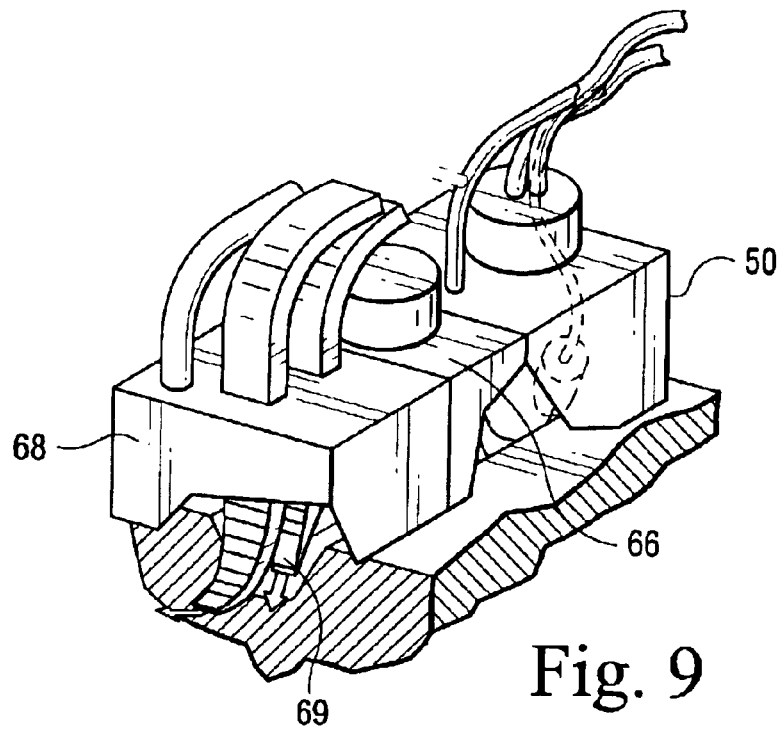
FIG. 9 is a view similar to FIG. 8 illustrate a further modular tooling assembly.

Referring to FIG. 9, the welding head module 50 is preceded by a peening module 66, in turn preceded by a water jet module 68. The water jet module 68 includes a water jet 67 and a gas jet 69 for removing particulate material from the crack and any residue from the excavation, if any. The peening module, of course, plastically deforms the component material surrounding the crack to form the seal ligament above an unclosed portion of the crack.

Figure 10:
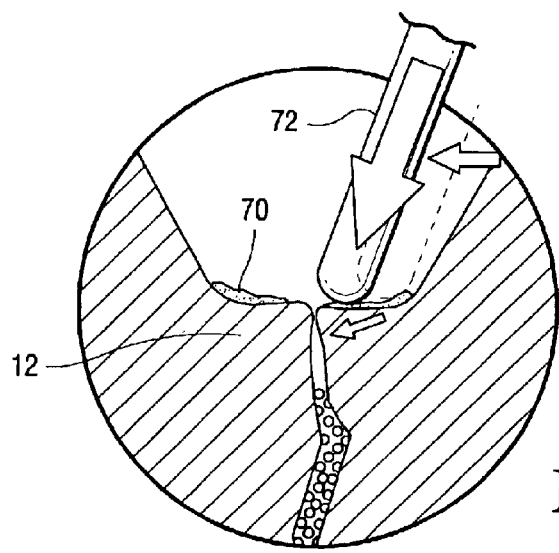
FIG. 10 illustrates the plastic deformation of the crack by using a pressing tool.
Figure 11:
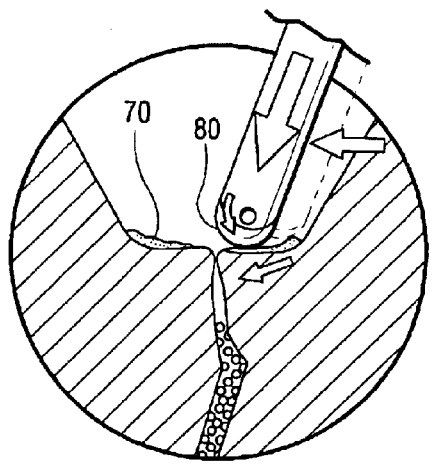
FIG. 11 illustrates the plastic deformation of the crack using a small-diameter rolling tool.
Figure 12:
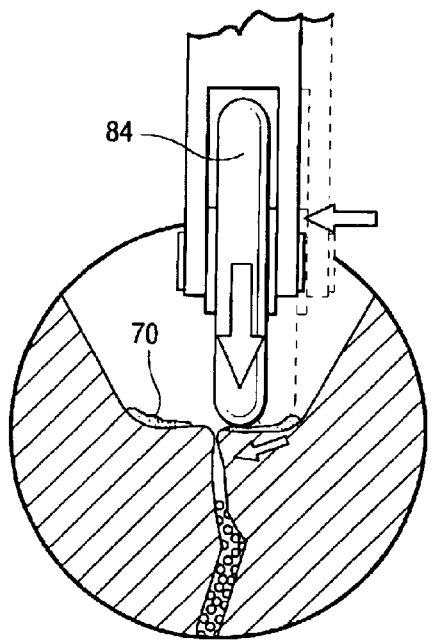
FIG. 12 illustrates a plastic deformation of the crack utilizing a large-diameter rolling tool.

FIGS. 10–12 illustrate use of the present invention to seal cracks which are resultant from a seal weld blowout. For example, in FIG. 10, residual weld material 70 lies on opposite sides of a crack from which weld material has blown through. To seal the crack, a peening head 72 is applied to opposite sides of the crack to form the seal ligament by plastic deformation of the material of component 12. The welding procedure previously described utilizing heat penetration only to a limited extent is then applied to the crack formation illustrated in FIG. 10. In FIG. 11, the plastic deformation is effected by a roller 80 which, by application of sufficient pressure, plastically deforms the material straddling the crack to form the sealed ligament. By application of constant pressure to the roller 80, the opposite sides of the crack deform plastically to form the sealed ligament. In FIG. 12, a large diameter roller 84 is applied with sufficient pressure to plastically deform the material on the opposite sides of the crack. In both FIGS. 11 and 12, weld material is applied subsequent to plastic deformation of the material straddling the crack to form the weld overlying the scaled ligament.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of welding a component having an opening through a surface and contaminants on opposite side faces defining the opening, comprising the steps of:
   (a) plastically deforming the surface of the component on at least one side of the opening to close the opening through the surface to a predetermined depth less than the depth of the opening to form a sealed ligament overlying an unclosed portion of the opening; and
   (b) hermetically sealing the closed surface opening by fusion-welding to a depth of penetration less than or equal to the predetermined depth of the sealed ligament to minimize or eliminate expulsion of the contaminants in the sealed ligament.

2. A method according to claim 1 wherein step (a) includes peening the surface prior to performing step (b).

3. A method according to claim 1 wherein step (a) includes pressing the surface of the component on at least one side of the opening to plastically deform the surface of the component to close the opening prior to performing step (b).

4. A method according to claim 1 wherein the surface opening is in contact with a fluid and including the step of excluding the fluid from contact with the surface opening at least prior to performing step (b) and performing step (b) with the fluid excluded from contact with the surface opening.

5. A method according to claim 1 wherein the surface opening is under water and including the step of excluding water from contact with the surface opening by forming a water exclusion zone prior to performing both steps (a) and (b).

6. A method according to claim 5 including the step of flowing a gas over the surface opening to remove contaminants from the surface opening prior to performing steps (a) and (b).

7. A method according to claim 5 including the step of flowing a liquid at high velocity over the surface opening to remove contaminants from the surface opening.

8. A method according to claim 1 including, prior to performing steps (a) and (b), excavating a portion of the surface opening to form a recess in the surface and wherein step (a) is performed on at least one face of the recess.

9. A method according to claim 1 including, subsequent to performing steps (a) and (b), (c) plastically deforming a surface of weld material overlying the closed surface by the fusion-welding of step (b) and, subsequent to step (c), applying additional weld material to overlie the weld material applied in step (b).

10. A method according to claim 1 wherein step (b) is performed by welding with sufficient heat input to minimize or eliminate expulsion of the contaminants in the sealed ligament.

11. A method according to claim 1 wherein step (b) is performed by welding with insufficient heat input to penetrate the unclosed portion of the opening.

12. A method according to claim 1 wherein step (b) is performed by welding with sufficient heat to minimize or eliminate out-gassing of the contaminants in the sealed ligament and insufficient heat to penetrate the unclosed portion of the opening.

13. A method of welding underwater a component having a surface opening, comprising the steps of:
   (a) plastically deforming the surface or near-surface material of the component on at least one side of the opening to close the surface opening to a predetermined depth less than the depth of the opening to form a sealed ligament between the surface of the component and an underlying unclosed portion of the surface opening;
   (b) excluding the water from contact with the surface opening; and
   (c) while the water is excluded, hermetically sealing the closed surface opening by fusion-welding to a depth of penetration no greater than the predetermined depth of the sealed ligament to minimize or eliminate expulsion of the water in the sealed ligament.

14. A method according to claim 13 including applying heat while fusion-welding sufficient to boil out water from the sealed ligament and insufficient to penetrate into the underlying unclosed portion of the defective component below the sealed ligament.

15. A method according to claim 13 wherein step (a) includes peening the surface of the component.

16. A method according to claim 13 including pressing the surface of the component to plastically deform a side surface of the opening to close the opening.

17. A method according to claim 13 including, prior to performing step (a), excavating a portion of the surface opening to form a recess in the surface and wherein step (a) is performed on at least one face of the recess.

* * * * *